United States Patent [19]
Prasad

[11] Patent Number: 5,378,263
[45] Date of Patent: Jan. 3, 1995

[54] HIGH PURITY MEMBRANE NITROGEN

[75] Inventor: Ravi Prasad, East Amherst, N.Y.

[73] Assignee: Praxair Technology, Inc., Danbury, Conn.

[21] Appl. No.: 996,981

[22] Filed: Dec. 21, 1992

[51] Int. Cl.⁶ .................................. B01D 53/22
[52] U.S. Cl. ............................. 95/54; 95/45; 96/9
[58] Field of Search ............... 95/45, 47–55; 96/8, 9

[56] References Cited

U.S. PATENT DOCUMENTS

| | | | |
|---|---|---|---|
| 4,119,417 | 10/1978 | Heki et al. | 96/8 X |
| 4,130,403 | 12/1978 | Cooley et al. | 95/49 |
| 4,180,388 | 12/1979 | Graham et al. | 96/8 X |
| 4,264,338 | 4/1981 | Null | 96/8 X |
| 4,435,191 | 3/1984 | Graham | 95/51 |
| 4,597,777 | 7/1986 | Graham | 95/51 |
| 4,781,907 | 11/1988 | McNeill | 95/54 X |
| 4,894,068 | 1/1990 | Rice | 95/51 |
| 4,931,070 | 6/1990 | Prasad | 95/52 |
| 5,071,451 | 12/1991 | Wijmans | 95/52 X |
| 5,102,432 | 4/1992 | Prasad | 55/16 |
| 5,169,412 | 12/1992 | Prasad et al. | 95/47 |
| 5,205,842 | 4/1993 | Prasad | 95/47 |
| 5,256,295 | 10/1993 | Baker et al. | 95/45 X |
| 5,256,296 | 10/1993 | Baker et al. | 95/45 X |
| 5,281,253 | 1/1994 | Thompson | 95/45 X |
| 5,282,969 | 2/1994 | Xu | 95/45 X |

*Primary Examiner*—Robert Spitzer
*Attorney, Agent, or Firm*—Alvin H. Fritschler

[57] ABSTRACT

Multi-stage membrane systems are arranged so that, with the same number of modules and compressors, mixing losses upon combining recycle and feed streams are minimized. Membrane surface area and power requirements are reduced thereby.

20 Claims, 3 Drawing Sheets

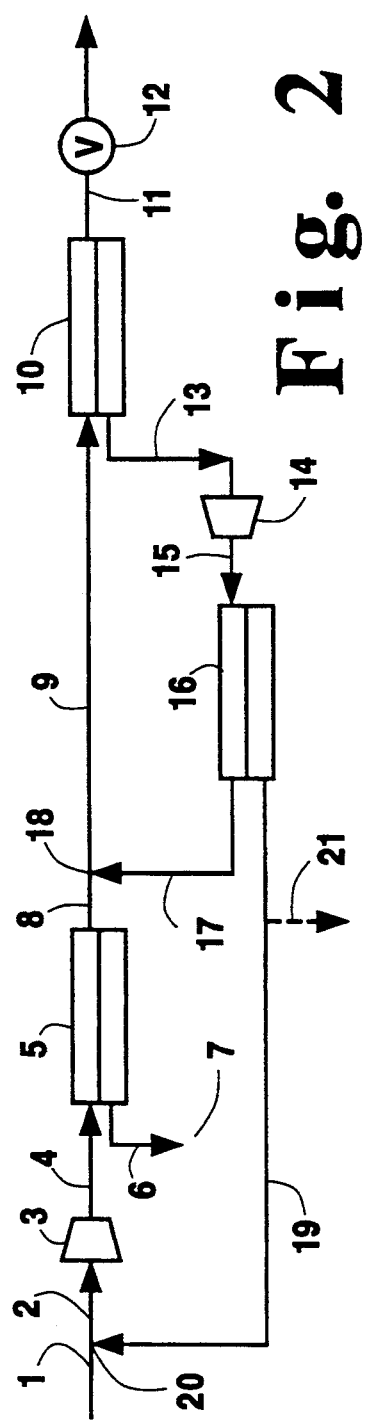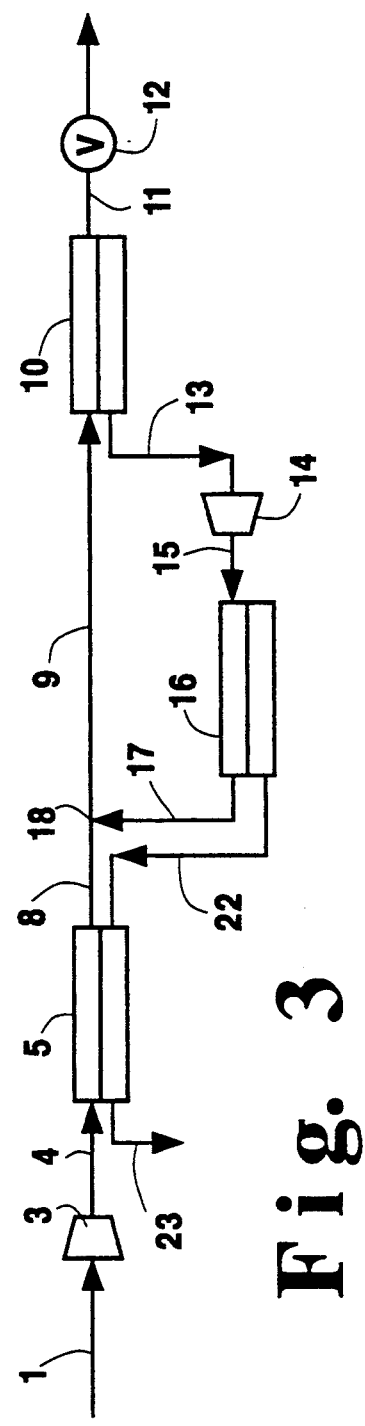

HIGH PURITY MEMBRANE NITROGEN

BACKGROUND OF THE INVENTION

1. Field of the Invention

The invention relates to the production of nitrogen from air. More particularly, it relates to the production of high purity nitrogen.

2. Description of the Prior Art

Permeable membrane processes and systems have been increasingly employed in air separation operations for the production of nitrogen. In such operations, feed air is brought into contact with the surface of the membrane, and oxygen, as the more readily permeable component of air, passes through the membrane while nitrogen, the less readily permeable component of air, is withdrawn from the membrane system as a nonpermeable product stream.

Although the fundamentals of gas separation using membranes have been known for a long time, it was not until recently that advances in membrane fabrication and packaging techniques have made membrane technology economically attractive for commercial air and other gas separations. Because of such developments and the inherent simplicity of the membrane technology, a high level of interest and activity exists with respect to gas separations in the membrane art, notably in the field of air separation applications.

Single stage hollow fiber membrane processes and systems have been developed for the production of enriched nitrogen from air. This approach has the advantage of minimizing the capital costs associated with membrane staging, fabrication, piping and the like. As the desired nitrogen purity level increases, however, product recovery decreases and the power and membrane surface area requirements increase, thereby rendering single stage operation less desirable from an overall viewpoint.

For nitrogen product purities above about 94%, two stage membrane processes and systems are desirable as an alternative to single stage operation. In two stage operations, with oxygen as the more selectively permeable component of feed air and nitrogen as the less selectively permeable component thereof, the permeate gas from the second stage is typically recycled. The blending of the permeate gas, which is nitrogen-rich as compared to air, with the feed air to membrane system reduces the oxygen content of the feed to the system and enhances nitrogen recovery over the obtainable using a single membrane stage. In such two-stage membrane operations, no extra machinery is required since the low pressure permeate recycle from the second stage is returned to the suction side of the feed gas compressor.

Two stage membrane systems are commonly employed to produce nitrogen product at purity levels of from about 97% to about 99.9%, with 98% nitrogen product being a typical product of such membrane operations. At high nitrogen purities above 99.0–99.7%, however, two stage membrane systems tend to become quite expensive. Thus, more power and increased membrane surface area are required to produce such high purity levels at given membrane permeation pressures. Alternatively, more power and increased trans-membrane pressure are required to produce such high purity nitrogen for a given surface area membrane. While two stage operations can be employed to produce nitrogen product at 99.99+% purity levels, as can single stage systems, the overall technical and economic feasibility of employing such one or two stage systems are diminished by the high costs of such operations at said high purity levels.

In order to achieve very high purity nitrogen product, e.g., above about 99.5%, by the highly desirable membrane approach, a two stage air separation membrane system has been integrated with a deoxo unit, in which residual oxygen in the nitrogen stream removed from the air separation membrane system is reacted with hydrogen or a fuel gas, such as methane. Such integrated membrane/deoxo systems, disclosed and illustrated in Prasad, U.S. Pat. No. 4,931,070, can be used to produce nitrogen product having a purity of up to about 99.95% or even higher, such as ultra-high purity levels on the order of about 99.999%. While such integrated two stage membrane/deoxo systems enable very high purity nitrogen product, including ultra-high purity nitrogen, to be achieved in a manner not feasible using the prior art one and two stage membrane systems referred to above, further improvement in the art is desirable in order to enable such increasingly high nitrogen purity requirements to be met on a more economically feasible basis, or without the use of hydrogen or other fuel gases.

In light of such industry requirements and expectations for the highly advantageous membrane technology approach to air separation, as well as other gas separations, attention has been directed to three stage membrane systems as an alternative to the use of a deoxo unit with two stage systems. In this regard, it is noted that three or more membrane stages have been employed heretofore in the so-called cascade separation approach to achieve enrichment of the permeate component of a feed gas mixture. For this purpose, the permeate gas separated from each membrane stage is passed as feed gas to the next succeeding membrane stage with an enriched permeate gas, e.g., oxygen in the case of air separation, being recovered from the last membrane stage. Non-permeate gas, e.g., nitrogen is removed from each such stage. This approach is not directed to the achieving of enhanced purity levels of the non-permeate gas.

The use of three membrane stages in air separation for very high nitrogen purity production is disclosed in "Nitrogen Production Using Membranes", Thompson, Prasad, Gottzmann and Reul-Heeren, a paper presented at a symposium at Antwerp, Belgium, Sep. 10–15, 1989. FIG. 1 of said paper illustrated one, two and three stage membrane systems for the recovery of nitrogen by air separation. In the three stage system illustrated therein, feed air is passed from a feed compressor to a first stage membrane from which a more selectively permeable oxygen stream is discharged to waste, with the less permeable nitrogen stream separated therefrom being passed to the second stage. The permeate stream from said second stage is recycled for compression with additional quantities of feed air being passed to the membrane system. The second stage non-permeate gas is passed to the third stage membrane, from which very high purity nitrogen product is recovered as non-permeate gas. The oxygen containing permeate gas from the third stage is compressed and recycled for passage to the second stage membrane together with additional quantities of the first stage permeate gas.

The three stage membrane system provides a potentially desirable alternative to the use of two membrane stages, together with a deoxo unit, for the production of nitrogen at high and very high purity levels, except for production of nitrogen at ultra-high purity levels. It will be appreciated that the desirable recycle of third stage permeate gas to the inlet to the second stage membrane requires the use of an additional compressor to boost the third stage permeate gas to the desired permeation pressure level for recycle of said gas to the second stage membrane. As those skilled in the art will readily appreciate, the benefits derived from the use of the additional third stage recycle, such as higher product recovery, less membrane area and the like, must outweigh the capital and operating costs associated with providing such third stage recycle feature such as the additional compressor. There is a genuine need and desire in the art to achieve such additional benefits in an economical manner so that the inherent simplicity and advantages of the membrane approach can be further extended to the production of high purity nitrogen from air without the need for combining the membrane system employed with a deoxo unit or any other such means for achieving such high purity levels.

Very high purity nitrogen is produced by air separation in tile membrane system of three or more stages disclosed by the Prasad patent, U.S. Pat. No. 5,102,432. In this system, the third stage permeate is recycled to the second stage, and the membrane surface area is distributed between the stages to achieve high product recovery and process performance. While the process and system of said Prasad patent represents a highly desirable advance in the art, further improvement is nevertheless desired in order to reduce the power requirements of multi-stage membranes. In particular, there are mixing losses associated with the blending of nitrogen-rich recycle streams with feed streams of a previous stage. The recycle streams are generally richer in nitrogen than are the retentate, or nonpermeate, streams with which they are mixed. This mixing increases the entropy and decreases the overall efficiency of the air separation operation. The elimination of such mixing losses would result in a more efficient and economical process for the production of very high purity nitrogen.

It is an object of the invention, therefore, to provide an improved membrane process and system for the production of nitrogen at high purity levels from air.

It is another object of the invention to provide an improved process or system utilizing at least three membrane stages for the production of high and very high purity nitrogen by air separation.

It is a further object of the invention to provide an improved membrane process and system for the separation of air and the production of high and very high purity nitrogen without the need for employing a deoxo unit therewith.

With these and other objects in mind, the invention is hereinafter described in detail, the novel features thereof being particularly pointed out in the appended claims.

SUMMARY OF THE INVENTION

The membrane stages are arranged and operated so that the recycle streams have the same composition as the retentate streams with which they are blended. Mixing losses are thereby eliminated, and the membrane area and power requirements for the production of high purity nitrogen are reduced.

BRIEF DESCRIPTION OF THE DRAWINGS

The invention is hereinafter described in detail with reference to the accompanying drawings in which:

FIG. 2 is a process flow diagram illustrating an embodiment of the three stage system of the invention;

FIG. 3 is a process flow diagram illustrating an embodiment of the three stage system of the invention with use of the third stage permeate for countercurrent purge of the first stage;

DETAILED DESCRIPTION OF THE INVENTION

The objects of the invention are accomplished by using the same number of membrane stages and gas compressors as employed in the Prasad patent, U.S. Pat. No. 5,102,432, referred to above, but with such membrane stages and gas compressors arranged in a novel fashion enabling the recycle streams to have the same composition as the retentate streams with which they are blended. As a result, the mixing losses previously encountered are eliminated, leading to a more efficient and economical process and system for the production of high purity nitrogen. As a result, both membrane surface area and the power required for the production of high purity nitrogen are advantageously reduced.

Figure 1A:
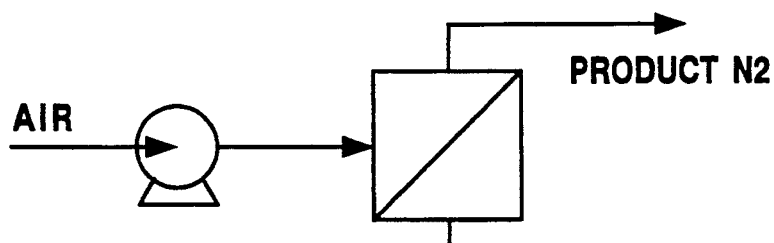
FIG. 1(a) is a process flow diagram illustrating a prior art single stage membrane system for the production of relatively low purity nitrogen.
Figure 1B:
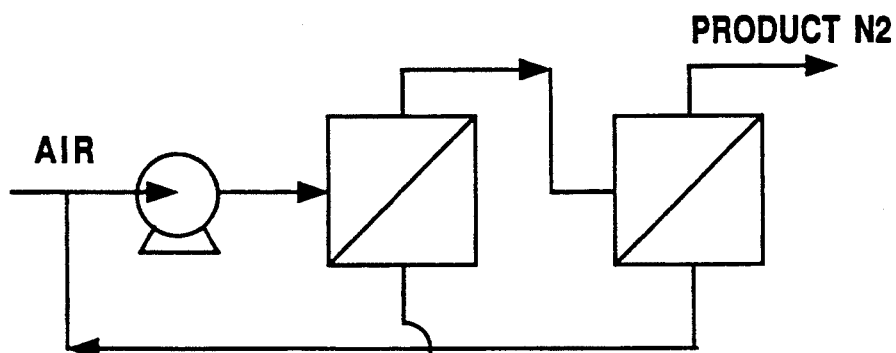
FIG. 1(b) is a process flow diagram illustrating a prior art two stage membrane system for the production of medium purity nitrogen.
Figure 1C:
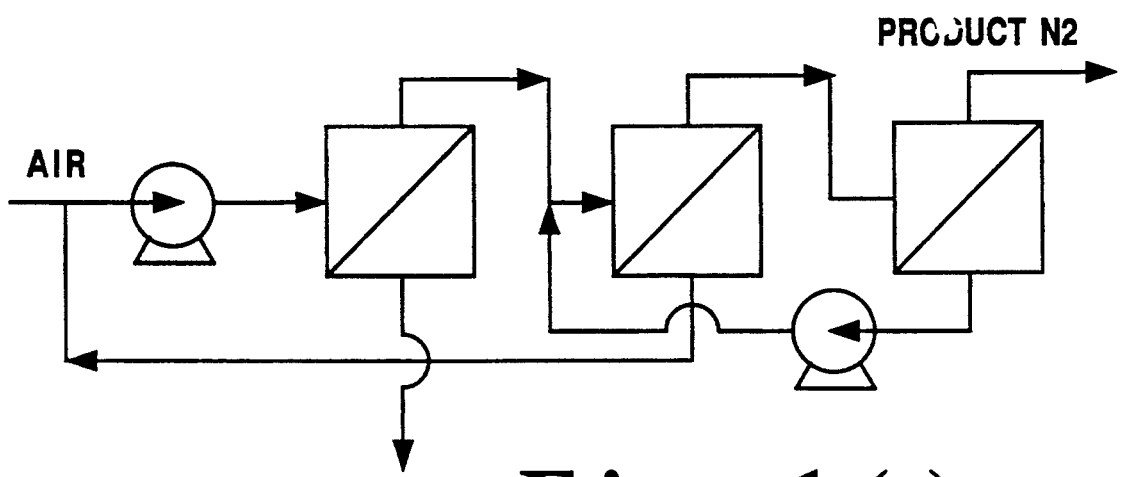
FIG. 1(c) is a process flow diagram illustrating a prior art three stage membrane system for the production of high purity nitrogen.

With reference to the drawings, FIG. 1(a), FIG. 1(b) and FIG. 1(c) are presented simply to illustrate the prior art arrangements generally applicable to single, two and three stage membrane systems. It will be noted that one compressor unit is employed in the single and two stage processing arrangements of FIG. 1(a) and 1(b), and that two compressor units are employed in the three stage system. In the three stage system of FIG. 1(c), it will be seen that the permeate from the third stage is recompressed by means of a second compressor and is blended with the first stage retentate to form the feed gas to the second stage. The nitrogen-rich, third stage permeate is thus recycled, but mixing losses are typically encountered because two streams of unequal composition are blended upon said mixing of third stage permeate with first stage retentate.

In the practice of the invention as shown in FIG. 2, the third stage is not in series with the retentate stream from the second stage, as in the FIG. 1(c) three stage prior art arrangement. Instead, the third stage is used to reprocess the permeate from the second stage. In the illustrated embodiment, ambient air enters the process through line 1, and after blending with any recycled gas, is passed through line 2 to the suction of feed compressor 3, where the feed air pressure is increased to a desired upper pressure level. The thus-compressed feed air is passed through line 4 to the input port of first stage, hollow fiber membrane module 5. The feed air flows at elevated pressure along the fibber bundle, becoming progressively leaner in oxygen and richer in nitrogen as the oxygen component of the feed air selectively permeates through the membrane. The low pressure local permeate is initially rich in oxygen, relative to air but this stream also becomes leaner in oxygen content as it progresses toward the product end of the membrane module. When the retentate reaches a predetermined nitrogen purity, it is desirable to terminate the first stage operation. The optimal value of the mid-stage composition is determined routinely on the basis of trial-and-error computations and will vary with the required nitrogen product purity for a given application. The total first stage permeate is collected and is passed through line 6 and is discharged as a waste stream 7. The retentate stream recovered from membrane module 5 at essentially feed pressure is passed through lines 8 and 9 to the high pressure feed input of second stage, hollow fiber membrane module 10. The retentate from said second stage is withdrawn through line 11, containing control value 12, for recovery as high purity nitrogen product. The permeate from said second stage membrane module 10 is nitrogen-rich relative to air, but oxygen-rich relative to the first stage retentate. The low pressure permeate from the second stage is withdrawn through line 13, recompressed to high pressure in compressor 14 and passed through line 15 to the high pressure input port of third stage, hollow fiber membrane module 16. The retentate from this third stage is passed through line 17 to point 18, where it is blended with the first stage retentate in line 8 to form the feed stream to second stage membrane module 10. The disposition of the third stage permeate depends upon its composition. If it is rich in nitrogen, relative to air, it is recycled through line 19 to point 20, where it is blended with feed air flowing to the system in line 1. Otherwise, it is discharged as waste in line 21.

In the practice of the invention in the illustrated embodiment, third stage membrane module 16 is operated at a stage cut adjusted to control the composition of the third stage retentate so as to be essentially the same as the composition of the first stage retentate. Such streams are combined at point 18, therefore, without the mixing losses that occur in the practice of the FIG. 1(c) embodiment upon combining the third stage permeate with the retentate from the first stage. It will be understood by those skilled in the art that the stage cut refers to the fraction of the feed that is permeated. The stage cut can be altered by throttling the flow of retentate from a membrane. The lower the retentate flow employed, the higher is the stage cut, and the higher is the purity of the nitrogen product. By the adjustment of the stage cut of the third stage membrane, the blending of the third stage permeate with the first stage retentate can, in the processing arrangement of the invention, readily be carried out without losses and with a reduction of both membrane area and the power required for the production of high purity nitrogen.

It has been shown in the art that a countercurrent flow process is more efficient for gas separation than the so-called "cross-flow" process commonly assumed to apply to membrane separations. The efficiency of the membrane process of the invention may be enhanced, in some circumstances, by using the permeate from the third stage as a countercurrent purge stream for the permeate side of the first stage. This processing alternative is illustrated in FIG. 3 of the drawing.

For convenience, the various elements of the FIG. 3 embodiment have been numbered as in FIG. 2 except as indicated herein. Thus, the system and process of FIG. 3 is the same as that of FIG. 2 other than respecting the third stage permeate. As shown in FIG. 3, this permeate is passed in line 22 to first stage membrane module 5, which is of a four port design, for passage on the permeate side thereof as a countercurrent purge stream. Such purge and the first stage permeate are withdrawn from membrane module 5 through line 22 for discharge from the system.

In the embodiments of the invention illustrated in FIGS. 2 and 3, the elimination of the mixing losses at point 18 between the first and second stages is significant since the nitrogen-rich streams being combined have already been processed and partially purified. Some mixing losses also occur at point 20 in the FIG. 2 embodiment, but these are less significant, since the gases being blended have little intrinsic value. Even these miner losses can be largely eliminated when the third stage permeate is used as a refluxing purge for the low pressure, permeate side of the first stage membrane in the FIG. 3 embodiment. It will be understood that the benefit to be derived from this mode of operation must be determined depending on the circumstances pertaining to each individual gas separation operation.

Figure 4:
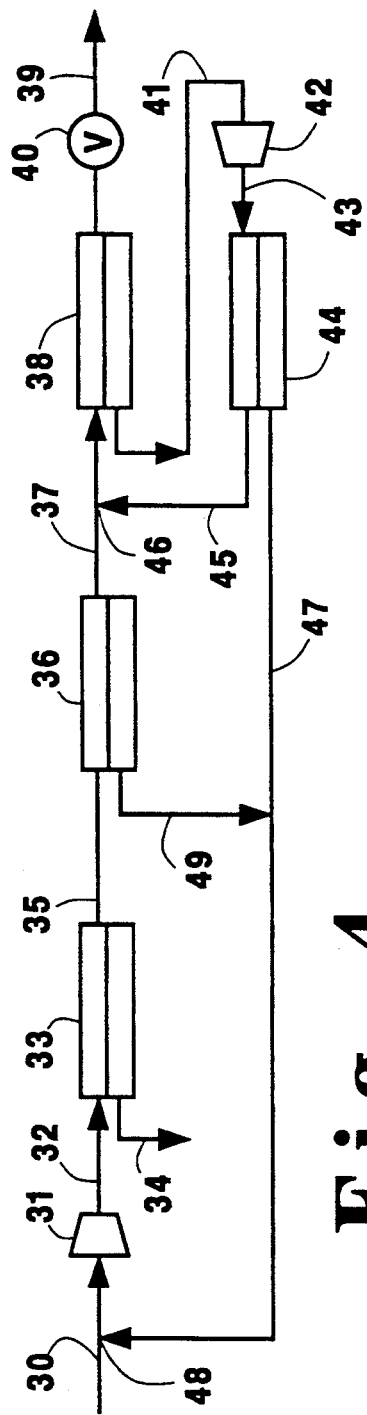
FIG. 4 is a process flow diagram illustrating a four stage embodiment of the invention.

FIG. 4 illustrates an advanced four-stage embodiment of the invention in which an additional stage may be employed when a very pure nitrogen product is required. In the illustrated four stage embodiment of the invention, the first three stages are in series with respect to the retentate stream, as in conventional processing. The fourth stage is used to process the third stage permeate so that it can be recycled to the third stage feed without mixing losses in the manner described above with respect to three stage systems. In the FIG. 4 embodiment, feed air in line 30 is passed to feed compressor 31 for compression to the desired feed pressure, with the thus-compressed feed air being passed in line 32 to first stage membrane module 33 for the initial separation of the feed air by the selective permeation of the more permeable oxygen component thereof. The permeate is withdrawn from the membrane through line 34 and discharged as a waste stream. The retentate stream is passed from first stage membrane module 33 in line 35 to second stage membrane module 36. Retentate therefrom is passed in line 37 to third stage membrane module 38 from which product nitrogen is recovered in line 39 containing flow control valve 40. Permeate is withdrawn from said third stage membrane through line 41 and is passed to compressor unit 42 therein for compression to the desired feed pressure for membrane separation. The thus-compressed third stage permeate is passed in line 43 to fourth stage membrane module 44. The retentate therefrom is withdrawn at a stage cut such that the composition thereof is essentially the same as that of the retentate from second stage membrane module 36. Said fourth stage retentate of such desired composition is passed in line 45 to combine with the second stage retentate at point 46 for passage of the combined stream in said line 37 as feed to third stage membrane 38. Permeate from said fourth stage membrane module 44 is passed in line 47 to combine with additional quantities of feed air at point 48 for passage in line 30 to feed compressor 31. The permeate from second stage membrane module 36 is passed in line 49 for combination with said fourth stage permeate in line 47 for recycle to the feed to the system. Alternatively, the fourth stage permeate may be used to reflux the permeate side of the second stage, as purge gas therein, with the permeate and purge exiting the second stage being recycled in line 47 to the air feed stream in line 30.

Figure 5:
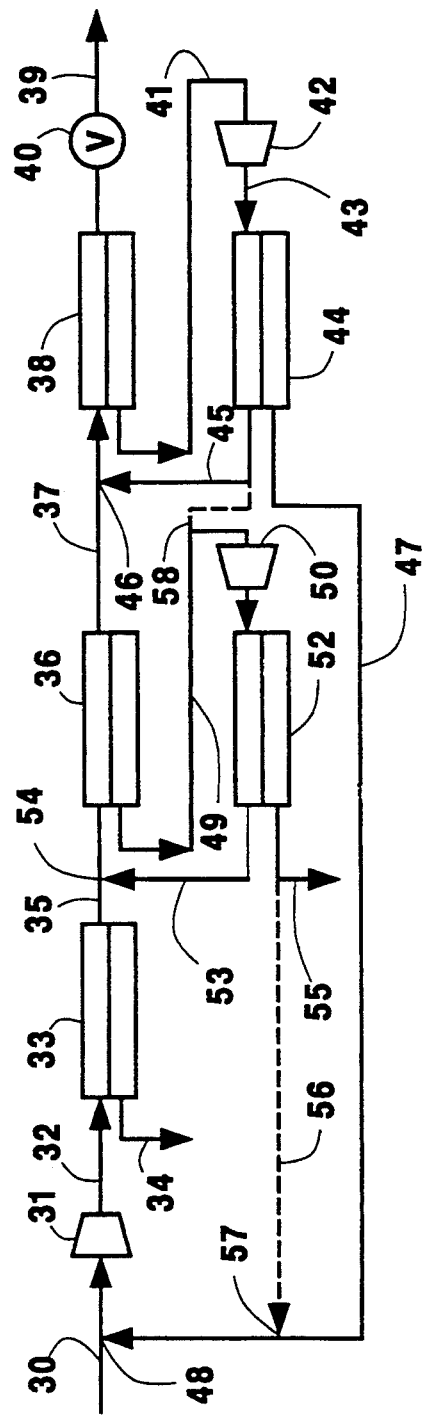
FIG. 5 is a process flow diagram illustrating a five stage embodiment of the invention.

FIG. 5 illustrates the addition of a fifth stage for the treatment of the second stage permeate in the manner in which the fourth stage described above is used for the treatment of the third stage permeate as described above. Because of the similarities of the advanced five stage system illustrated in FIG. 5 to the advanced four stage system shown in FIG. 4, the same numbering is used in both drawings except as particularly noted with respect to the FIG. 5 embodiment. In said latter embodiment, permeate from second stage membrane module 36 is passed in line 49 not for combining with fourth stage permeate in line 47, but instead is passed to compressor 50, with the compressed gas therefrom being passed in line 51 to fifth stage membrane module 52 from which retentate is recycled in line 53 for combining, at point 54, with first stage retentate passing on line 35 as feed to said second stage membrane module 36. Permeate from said fifth stage membrane module 52 is either withdrawn from the system through line 55 as waste, or, alternatively, can be passed in line 56 for combining, at point 57, with fourth stage permeate being recycled in line 47 for combining with feed air in line 30 at point 48. In a further alternative embodiment of the invention, the fourth stage permeate can be passed in line 58 for combination with the second stage permeate in line 49, for compression and passage to fifth stage module 52 as feed therefor. This enables a further reduction in mixing losses to be achieved, as the fourth stage permeate may be much richer in nitrogen than air and close to the second stage permeate. In four and five stage embodiments of the invention, it is also possible to use the permeate from the fourth and fifth stage to reflux the permeate side of the second and/or first stage in series, as is described above with respect to three stage systems. Those skilled in the art will appreciate that the benefits of a fifth stage, or other additional stages, will depend on the costs of the additional equipment required.

The advantages of the invention are further shown by the following examples used to further illustrate the invention, without limiting the scope thereof as set forth in the appended claims. In such examples, the efficiency of the three stage process as carried out in the practice of the FIG. 2 embodiment of the invention is compared with the three stage process of the FIG. 1(c) embodiment of the prior art having a 25/25/50 area distribution between the first, second and third stages. In the practice of the invention, the stage cut is adjusted so that the retentate from the third stage is essentially the same as the first stage permeate with which it is blended. The examples are based on countercurrent flow with complete radial mixing, the most favorable mode of operation for the prior art three stage process. The membrane properties and operating parameters employed are as follows:

Oxygen Permeability/thickness $P_o/t = 3.16 \times 10^5$ Barrers/cm

Temperature T = 100° F.
Higher Pressure $P_H$ = 150 psia
Lower Pressure $P_L$ = 15 psia Two values of oxygen/nitrogen separation factor, i.e. alpha, were employed, alpha=4 and alpha=6, corresponding to ordinary and advanced membrane properties. By computer modelling, the Area Factor, membrane surface area required per unit of product, and the relative total power consumed, for both processes was determined for various levels of product purity. The results for an alpha of 4 are shown in Table I below.

TABLE I

| $N_2$ Purity % | Standard 3-Stage Process | | Advanced 3-Stage Process of this Invention Alpha = 4 | | | |
|---|---|---|---|---|---|---|
| | Area Factor | Power Factor | Mid-Stage $O_2$ % | Area Factor | Power Factor | Area split $A_1:A_2:A_3$ |
| 99.50 | 4.75 | 5.63 | 5.0 | 4.57 | 5.49 | 41:50:9 |
| | | | 4.0 | 4.53 | 5.46 | 48:43:9 |
| | | | 3.5 | 4.53 | 5.47 | 52:40:8 |
| 99.90 | 7.74 | 8.12 | 3.5 | 7.37 | 7.86 | 34:59:7 |
| | | | 3.0 | 7.30 | 7.81 | 38:55:7 |
| | | | 2.5 | 7.26 | 7.79 | 43:50:7 |
| | | | 2.0 | 7.25 | 7.82 | 48:45:7 |
| 99.99 | 15.44 | 14.58 | 2.5 | 13.71 | 13.11 | 24:72:4 |
| | | | 2.0 | 13.29 | 12.79 | 28:68:4 |
| | | | 1.5 | 12.91 | 12.53 | 42:53:5 |
| | | | 1.0 | 12.65 | 12.43 | 42:53:5 |
| | | | 0.75 | 12.64 | 12.52 | 48:47:5 |

The data in Table I show that Area and Power Factors for the advanced three stage process of the invention depend on the mid-stage oxygen impurity concentration, i.e. between stages 1 and 2. By varying this concentration, it has been found that the Area and Power Factors are minimized for a particular value of the mid-stage concentration. For this concentration, the process of the invention is found to have lower values of both the Area Factor and the Power Factor than those of the prior art three stage process. For purposes hereof, the Area Factor shall be understood to constitute a measure of the relative amount of membrane area required per unit of product flow. Power Factor is a measure of the relative power consumed per unit quantity of product produced. For a product nitrogen purity of 99.5%, said Factors are some 3–5% lower than those of the prior art process. At a product purity of 99.99% the Area Factor is 18% lower for the invention than for the prior art process, and the Power factor is 15% lower. Thus, the advanced three stage process of the invention shows substantial benefits over the prior art process for the production of high purity nitrogen, particularly at very high purity levels. Such improvement is achieved without the need for additional equipment, and without any increased processing complexity. In practical commercial operations, the invention will generally enable both lower capital costs and lower operating costs to be achieved compared to the prior art three stage process and system.

The last column in Table I shows the relative membrane surface areas in stage 1, stage 2 and stage 3 of the invention. For a product purity of 99.5%, most of the membrane area is desirably in stage 1 and stage 2, which are nearly the same. Stage 3 accounts for less than 10% of the total surface area. As the product purity is increased, the relative area in stage 2 increases, but the stage 3 surface area actually decreases. This is in contrast to the prior art three stage process of the Prasad patent U.S. Pat. No. 5,102,432, wherein the area of the third stage increases as the product purity is increased. The corresponding results for a membrane separation factor of 6 are shown in Table II below.

TABLE II

| | Standard 3-Stage Process | | Advanced 3-Stage Process of this Invention Alpha = 6 | | | |
|---|---|---|---|---|---|---|
| N₂ Purity % | Area Factor | Power Factor | Mid-Stage O₂ % | Area Factor | Power Factor | Area split A₁:A₂:A₃ |
| 99.50 | 3.86 | 3.81 | 4.0 | 3.67 | 3.66 | 46:45:9 |
| | | | 3.5 | 3.66 | 3.65 | 50:42:9 |
| | | | 3.0 | 3.65 | 3.64 | 54:38:8 |
| | | | 2.5 | 3.65 | 3.65 | 59:33.8 |
| | | | 2.0 | 3.66 | 3.66 | 65:28:7 |
| 99.90 | 5.66 | 4.75 | 3.5 | 5.51 | 4.70 | 35:57:8 |
| | | | 3.0 | 5.48 | 4.67 | 38:54:8 |
| | | | 2.5 | 5.45 | 4.66 | 41:51:8 |
| | | | 2.0 | 5.44 | 4.67 | 46:46:8 |
| | | | 1.5 | 5.45 | 4.69 | 52:41:7 |
| 99.99 | 9.29 | 6.75 | 2.0 | 8.68 | 6.45 | 30:64:6 |
| | | | 1.5 | 8.56 | 6.40 | 35:59:6 |
| | | | 1.0 | 8.48 | 6.39 | 41:53:6 |
| | | | 0.75 | 8.47 | 6.42 | 46:48:6 |

The data in Table II also show the Area and Power Factors to be lower in the practice of the invention than for the prior art three stage process. To achieve this benefit, the mid-stage oxygen concentration must be adjusted and assume progressively lower values as the nitrogen product purity increases. The optimal values of the mid-stage oxygen concentration are considerably lower than the values corresponding to the conventional criterion that the local permeate is everywhere oxygen rich compared to air. This is largely due to the use of the countercurrent flow model of membrane performance, which enhances the efficiency of this stage in both processes.

The higher separation factor used in the Table II example greatly reduces the Area and Power Factors for both the advanced three stage process of the invention and the prior art three stage process. It will be appreciated that the advantages for the invention as used in the production of 99.99% nitrogen are less dramatic in Table II than in Table I. The final process is considerably more efficient, however, because membranes with a high separation factor require less recycling to perform the separation, and thus the particular mode of recycling is somewhat less significant.

Various changes and modifications can be made in the details of the membrane process and system herein described without departure from the scope of the invention as recited in the appended claims. Thus, while hollow fiber membranes are generally preferred, other membrane configurations can be employed, e.g. spiral wound membranes. While the latter type of membranes tend to perform in accordance with the model for cross-flow type permeation, with not particularly impressive performance, in air separation and many other lower pressure gas separations, the use of the three stage approach of the invention provides such membranes with more of the desirable attributes of countercurrent type permeation, thereby improving the performance thereof. In the practice of the invention, the gas flow patterns employed can be of the cross-flow type or can be of the generally more preferred countercurrent flow type. Using the highly advantageous hollow fiber membrane configurations, the feed flow can either be inside-out, in which the feed air is passed to the bores of the hollow fibers for passage therethrough to the shell side of the membrane bundle, or outside-in, with passage of the feed air to the outside surface of the membrane bundle and permeate gas being recovered from the bores of the hollow fiber. In order to establish a countercurrent flow pattern between the gas within the bores of the hollow fibers and the gas on the outer surface of the membrane bundles, the hollow fiber bundles can be encased within an impervious barrier over the entirety of its longitudinal outer surface, except for a non-encased circumferential area for gas flow in or out of the system.

The process and system of the invention, as described above, enables high or very high purity product to be produced without the need to pass any retentate to a catalytic reaction unit for reaction of residual permeate therein. Those skilled in the art will appreciate, however, that in some instances it may nevertheless be desirable to utilize adsorption, catalytic reaction or ether such means, in certain embodiments, for ultra-high purity clean-up, i.e, trace contaminant removal, as in the production of 99.90–99.95+ product. In such instances, the highly desirable advantages of the subject invention pertain as described herein.

The hollow fiber or other desirable membranes employed in the practice of the invention may comprise either composite membranes or asymmetric membranes. The separation factor of commonly available membrane materials is generally within the range of from about 2 to about 12, typically about 4 to about 8. Composite type membranes have a very thin separation layer deposited on a porous substrate. The separation layer, which determines the selectivity characteristics of the membrane can be any desired membrane material, such as ethyl cellulose, cellulose acetate or the like, deposited on a convenient substrate material, such as polysulfone. Asymmetric membranes comprise one material, e.g., polysulfone, with two separate morphological regions, one comprising a thin, dense skin region that determines the selectivity characteristics of the membrane, and a less dense, porous support region. Both types of membranes can have variables therein, as by the treatment with other coating materials to cure defects therein and the like.

While the invention has been described above particularly with respect to the use of a three stage membrane system for air separation in the production of very high purity nitrogen produced gas, it will be understood that the invention can also be used for the separation of other gas mixtures wherein it is desired to achieve the enhanced separation recovery of the less selectively permeable components of the mixtures. The more valuable the less selectively permeable component may be, the more importance will be attached to its production at high recovery levels, as is obtainable in the practice of the invention. The recovery of argon, as the less selectively permeable component, from mixtures thereof with oxygen is an example of a commercially significant gas separation operation that can be achieved in the practice of the invention. Other suitable applications of the invention include the separation of methane from more permeable carbon dioxide, or from nitrogen in tertiary oil recovery operations, and the separation of rare gases, such as neon, krypton and xenon, from mixtures thereof with con, non, more selectively permeable impurities. In such applications, as in the embodiments referred to above with respect to the production of high and very high purity nitrogen, the third stage permeate is compressed and recycled to the second stage, and the area distribution between the first, second and third stage is as described herein. The surface area distribution indicated above with respect to air separation will generally be understood to pertain with respect to such other desirable gas separations. The separation factors of the membrane materials used for such non-air separation applications will generally be in the range of from about 2 to about 12 referred to above, but those skilled in the art will appreciate that for particular separations, such as methane from carbon dioxide, separation factors much higher than these are commonly employed and two stage systems may be preferable in such cases.

Because of their inherent simplicity and advantages, gas separation membranes are highly desired for a wide variety of industrial gas separation applications, such as the need for separating air to produce nitrogen efficiently at very high purity levels and with enhanced product recovery levels. By enabling membranes to satisfy such requirements, including the capability of doing so while eliminating the need for separate deoxo treatment and reducing the surface area, and power requirements of the gas separation operation, the invention serves in a significant manner to broaden the scope of application of the highly desirable membrane technology in addressing the ever-increasing needs of modern industrial activities. This is accomplished in the practice of the invention with the advantageous use of the same number of membrane modules and compressors as in the prior art system of multi-stage modules.

I claim:

1. An improved membrane process for the production at high or very high purity, of a less selectively permeable component of a feed gas containing said component and a more selectively permeable component, comprising:
   (a) introducing the feed gas at a feed pressure to a first stage membrane module of a membrane system containing a total of at least three membrane module stages, said system being capable of selectively permeating the more selectively permeable component thereof;
   (b) separately removing the less selectively permeable component from the first stage essentially at the feed pressure as retentate, and the more selectively permeable component therefrom at a pressure lower than the feed pressure as permeate;
   (c) passing the retentate from the first stage to succeeding stages in series, essentially at the feed pressure, as feed gas thereto;
   (d) separately removing the retentate from each said stage in series essentially at the feed pressure, and the permeate therefrom at a pressure lower than the feed pressure, the retentate from the last stage in series being recovered as high or very high purity gas, without non-membrane treatment for the removal of residual amounts of permeate therein;
   (e) compressing the permeate from the last stage in series and passing said permeate to an additional membrane module stage as feed gas therefor; and
   (f) recycling retentate from said additional membrane module stage for blending with the retentate from the next-to-last-stage in series and for passage to the last stage in series, the stage cut of the additional membrane module stage being such that the retentate therefrom has essentially the same composition as the retentate from the next-to-last stage,
whereby the less selectively permeable component is advantageously recovered as a high or very high purity product at advantageously low membrane surface area and power requirements.

2. The process of claim 1 in which said membrane system has three membrane module stages.

3. The process of claim 2 in which the permeate from said additional membrane module stage is passed to the permeate side of the first stage for use as purge therein.

4. The process of claim 2 in which the feed gas comprises air, the permeate is oxygen, and the retentate is nitrogen.

5. The process of claim 1 in which said membrane system has four membrane stages.

6. The process of claim 5 in which the permeate from said additional membrane module stage and from the second stage in series is recycled for passage, with additional quantities of feed gas, to the first stage membrane module.

7. The process of claim 5 in which the permeate from the additional membrane module stage is passed to the permeate side of the second and/or first stage in series for use as purge therein.

8. The process of claim 1 in which the membrane system has five membrane stages.

9. The process of claim 8 in which three membrane modules stages are in series and in which the permeate from the second stage in series is compressed and passed to a second additional membrane module stage, the retentate therefrom being recycled for blending with the first stage retentate passing to the second stage in series as feed gas therefor.

10. The process of claim 9 in which the stage cut of the second additional membrane module stage is such that the retentate therefrom has essentially the same composition as the retentate from the first stage in series.

11. The process of claim 9 in which permeate from the first additional membrane module stage is combined with the permeate from the second stage in series upstream of the compression thereof and passed to said second additional membrane module stage.

12. The process of claim 9 in which permeate from the first and/or second additional membrane module stage is passed to the permeate side of the second and/or first stage in series for use as purge therein.

13. The process of claim 1 in which the feed gas comprises air, the permeate is oxygen, and the retentate is nitrogen.

14. An improved membrane system for the production, at high or very high purity, of a less selectively permeable component of a feed gas containing said component and a more selectively permeable component, comprising:
   (a) a membrane system containing a total of at least three membrane module stages and capable of selectively permeating the more selectively permeable component of the feed gas;
   (b) conduit means for inducing the feed gas at a feed pressure to a first stage of the membrane system;
   (c) conduit means for separately removing the less selectively permeable component from the first stage and succeeding stages in series essentially at the feed pressure as retentate, and the more selectively permeable component, at a lower pressure, as permeate, said conduit means including means to pass the retentate from the first stage to succeeding stages in series, at the feed pressure, as feed gas thereto, the conduit means from the last stages in series being adapted for the recovery of retentate as high or very high purity gas;

(d) compression means for compressing the permeate from the last stage in series;

(e) an additional membrane module stage for selectively separating the permeate from the last stage in series into the less selectively permeable component as retentate, and the more selectively permeable component as permeate;

(f) conduit means for passing the compressed permeate from the last stage in series to said additional membrane module stage; and (g) conduit means for recycling retentate from said additional membrane module stage for blending with the retentate from the next-to-last stage in series for passage to the last stage in series, whereby the less selectively permeable component may be advantageously recovered as a high or very high purity product at advantageously low membrane surface area and power requirements.

15. The system of claim 14 in which said membrane system contains three membrane module stages.

16. The system of claim 15 and including conduit means for passing permeate from said additional membrane module stage as purge gas to the permeate side of the first stage.

17. The system of claim 14 in which the membrane system contains four membrane module stages.

18. The system of claim 17 and including conduit means for recycling permeate from said additional membrane module stage and from the second stage in series for passage, such additional quantities of feed gas, to the first stage membrane module.

19. The system of claim 14 in which the membrane system contains five membrane module stages.

20. The system of claim 19 in which three membrane module stages are in series and including (a) compression means for compressing the permeate from the second stage in series, (b) a second additional membrane module stage; (c) conduit means for passing compressed permeate from said second stage in series to said second additional membrane module stage; and (d) conduit means for recycling retentate from said second additional membrane module stage for blending with the first-stage retentate passing to the second stage in series as feed gas therefor.

* * * * *